United States Patent
Shin et al.

(10) Patent No.: US 10,330,841 B2
(45) Date of Patent: Jun. 25, 2019

(54) POLARIZING PLATE, METHOD FOR MANUFACTURING SAME AND LIQUID-CRYSTAL DISPLAY DEVICE COMPRISING SAME

(71) Applicant: SAMSUNG SDI CO., LTD., Yongin-si, Gyeonggi-do (KR)

(72) Inventors: Kwang Ho Shin, Uiwang-si (KR); Eun Su Park, Uiwang-si (KR); Dong Yoon Shin, Uiwang-si (KR); Hae Ryong Chung, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 196 days.

(21) Appl. No.: 14/915,065

(22) PCT Filed: Aug. 12, 2014

(86) PCT No.: PCT/KR2014/007487
§ 371 (c)(1),
(2) Date: Feb. 26, 2016

(87) PCT Pub. No.: WO2015/030393
PCT Pub. Date: Mar. 5, 2015

(65) Prior Publication Data
US 2016/0209568 A1 Jul. 21, 2016

(30) Foreign Application Priority Data

Aug. 29, 2013 (KR) .................. 10-2013-0103080
Jul. 11, 2014 (KR) .................. 10-2014-0087803

(51) Int. Cl.
*G02B 5/30* (2006.01)
*B29C 55/08* (2006.01)
*B32B 33/00* (2006.01)
*B32B 37/12* (2006.01)
(Continued)

(52) U.S. Cl.
CPC ............ *G02B 5/3083* (2013.01); *B32B 33/00* (2013.01); *G02F 1/133528* (2013.01);
(Continued)

(58) Field of Classification Search
CPC ........... G02F 1/133528; G02F 1/13363; G02F 1/133634; G02B 5/30; G02B 5/3025;
(Continued)

(56) References Cited

U.S. PATENT DOCUMENTS

| 8,692,959 B2 | 4/2014 | Shinohara et al. |
| 2012/0113356 A1 | 5/2012 | Yu et al. |
| 2013/0100378 A1 | 4/2013 | Murata |

FOREIGN PATENT DOCUMENTS

| CN | 101265335 A | 9/2008 |
| CN | 101374892 A | 2/2009 |

(Continued)

OTHER PUBLICATIONS

Chinese Office action dated May 25, 2017, corresponding to Chinese Patent Application No. 201480047525.9 (8 pages).

(Continued)

*Primary Examiner* — Stephone B Allen
*Assistant Examiner* — Adam W Booher
(74) *Attorney, Agent, or Firm* — Lewis Roca Rothgerber Christie LLP

(57) ABSTRACT

The present invention relates to a polarizing plate including a polarizer and a polyester film formed on an upper side of the polarizer, wherein the polyester film has a maximum thermal shrink angle of about 10° or less, and any one of a refractive index of x-axis direction nx at a wavelength of 550 nm and a refractive index of y-axis direction ny at a wavelength of 550 nm of about 1.65 or more; a method of preparing the polarizing plate; and a liquid crystal display apparatus comprising the polarizing plate.

15 Claims, 2 Drawing Sheets

(51) Int. Cl.
*B32B 37/14* (2006.01)
*G02F 1/1335* (2006.01)
*G02F 1/13363* (2006.01)

(52) U.S. Cl.
CPC ........ *G02F 1/133634* (2013.01); *B29C 55/08* (2013.01); *B32B 37/12* (2013.01); *B32B 37/14* (2013.01); *B32B 2307/42* (2013.01); *B32B 2457/202* (2013.01); *G02B 5/3033* (2013.01)

(58) Field of Classification Search
CPC .... G02B 5/3033; G02B 5/3041; G02B 5/305; G02B 5/3083; B32B 33/00; B32B 37/12; B32B 37/14; B32B 2307/42; B32B 2457/202; B32B 27/36; B29C 55/08
See application file for complete search history.

(56) References Cited

FOREIGN PATENT DOCUMENTS

| | | |
|---|---|---|
| CN | 101672946 A | 3/2010 |
| CN | 102959459 A | 3/2013 |
| JP | 60-162222 A | 8/1985 |
| JP | 2000-171636 A | 6/2000 |
| JP | 2004-061836 A | 2/2004 |
| JP | 2009-166442 A | 7/2009 |
| JP | 2010-046817 A | 3/2010 |
| JP | 2011053271 A2 | 3/2011 |
| JP | 2013-047844 A | 3/2013 |
| KR | 10-2011-0014515 A | 2/2011 |
| KR | 10-2013-0040227 A | 4/2013 |
| TW | 201307881 A | 2/2013 |
| TW | 201329584 A | 7/2013 |
| WO | WO 2011/093478 A1 | 8/2011 |

OTHER PUBLICATIONS

Taiwanese Patent Office action dated Mar. 21, 2016 issued in corresponding TW Application No. 103129348, 9 pages.

Korean Office action dated Sep. 20, 2016, corresponding to Korean Patent Application No. 10-2014-0087803 (6 pages).

International Search Report corresponding to PCT/KR2014/007487, dated Nov. 20, 2014, 6 pages.

POLARIZING PLATE, METHOD FOR MANUFACTURING SAME AND LIQUID-CRYSTAL DISPLAY DEVICE COMPRISING SAME

CROSS-REFERENCE TO RELATED APPLICATION(S)

This application is a national stage and claims priority to and the benefit of International Application No. PCT/KR2014/007487 filed on Aug. 12, 2014, which claims priority to and the benefit of Korean Patent Application No. 10-2013-0103080 filed Aug. 29, 2013 and Korean Patent Application No. 10-2014-0087803 filed Jul. 11, 2014, the entire contents of which are incorporated herein by reference.

TECHNICAL FIELD

The present invention relates to a polarizing plate, a method of preparing the same, and an optical display apparatus including the same.

BACKGROUND ART

Polarizing plates are used inside and outside a liquid crystal cell for purpose of controlling an oscillation direction of light in order to visualize display patterns of a liquid crystal display apparatus. The polarizing plate includes a polarizer, and a protective film, which is formed on at least one side of the polarizer. Typically, although the protective film is a triacetyl cellulose (TAC) film, the TAC film is more expensive than typical polymer films. Therefore, low-priced polymer films including polyethylene terephthalate (PET) films are used to replace the TAC film.

A common PET film is a film which is drawn in a machine direction (md) and/or a transverse direction (td) by a certain draw ratio in order to improve a yield and have a range of phase difference (i.e., retardation). However, the common pet film which is drawn in md and td has high molecular orientation angle, and thus there is a large deviation between an absorption axis of a polarizer and an optical axis of the pet film. Therefore, polarization degree of the polarizing plate and brightness of a screen may be decreased. Further, due to this, contrast ratio (cr) of the liquid crystal display apparatus may be deteriorated. Still further, the common PET film may decrease polarization degree of the polarizer and transmittance of the polarizing plate and make rainbow spots worse, when exposed at high temperature for a long period of time. Moreover, when the PET film is drawn, a portion of, particularly, an end portion of the PET film may suffer from deterioration in optical properties due to its asymmetric molecular orientation in incorporating into a polarizing plate, and thus, there has been a limitation in its use. Further, since the PET film is a drawn film, the film can suffer from rainbow spots in using it in liquid crystal display apparatus.

The background art of the present invention is described in KR 10-2011-0014515 A.

DISCLOSURE

Technical Problem

It is one object of the present invention to provide a polarizing plate that can suppress rainbow spots, secure viewing angle, improve an image quality.

It is another object of the present invention to provide a polarizing plate that can improve polarization degree of the polarizer and transmittance, thereby having excellent optical properties and high contrast ratio.

It is a further object of the present invention to provide a polarizing plate that may be no deterioration of polarization degree thereof, or be able to minimize the deterioration, and thus the polarizing plate can suppress rainbow spots, even if the polarizing plate is exposed to high temperature.

It is a further object of the present invention to provide a polarizing plate having high economic feasibility by using the drawn polyester film as a protective film for the polarizing plate over the whole orientations.

Technical Solution

An aspect of the subject invention relates to a polarizing plate comprising a polarizer; and a polyester film formed on an upper side of the polarizer, wherein the polyester film has a maximum thermal shrink angle of about 10° or less, and any one of a refractive index of x-axis direction (nx) at a wavelength of 550 nm and a refractive index of y-axis direction (ny) at a wavelength of 550 nm of about 1.65 or more.

Another aspect of the subject invention relates to a polarizing plate comprising a polarizer; and a polyester film formed on an upper side of the polarizer, wherein the polyester film has an absolute value of molecular orientation angle (θr) of about 5° or less.

In a specific example, an absolute value of nx−ny may be about 0.1 to about 0.2.

In a specific example, the polyester film may have a maximum thermal shrinkage of about 0.8% or less.

In a specific example, the polyester film may have an absolute value of molecular orientation angle (θr) of a polyester molecule based on a transverse direction (TD) of about 0° to about 5°.

In a specific example, the polyester film may have a thickness of about 25 to about 115 μm, and a front retardation (Ro) of about 5,000 to about 15,000 nm at a wavelength of 550 nm.

In a specific example, the front retardation (Ro) may be about 10,100 to about 12,000 nm.

In a specific example, the polyester film may be a TD drawn film.

In a specific example, the polyester film may have a degree of biaxiality (NZ) of about 1.8 or less at a wavelength of 550 nm, as represented by Equation 1:

$$NZ = (nx-nz)/(nx-ny) \qquad \text{Equation 1}$$

(whererin nx, ny and nz are refractive index in x-axis direction, y-axis direction and z-axis direction of the polyester film at a wavelength of 550 nm, respectively).

In a specific example, the polyester film may have a retardation in thickness direction (Rth) of about 15,000 nm or less at a wavelength of 550 nm, as measured by Equation 2:

$$Rth = \{(nx+ny)/2 - nz\} \times d \qquad \text{Equation 2}$$

(whererin nx, ny and nz are refractive index in x-axis direction, y-axis direction and z-axis direction of the polyester film at a wavelength of 550 nm, respectively; and d is a thickness of the polyester film (unit: nm)).

In a specific example, the polyester film may be a film formed of at least one of polyethylene terephthalate, polybutylene terephthalate, polyethylene naphthalate and polybutylene naphthalate.

In a specific example, an optical film may be further formed to a lower side of the polarizer.

In a specific example, the optical film may have a front retardation (Ro) of about 40 to about 60 nm at a wavelength of 550 nm.

In a specific example, the optical film may be a film formed of at least one of cellulose, polyester, cyclic polyolefin, polycarbonate, polyether sulfone, polysulfone, polyamide, polyimide, polyolefin, polyacrylate, polyvinyl alcohol, polyvinyl chloride, and polyvinylidene chloride resins.

In a specific example, the polarizing plate may have a polarization degree of about 99.99% or more, and a transmittance of about 40% or more.

Another aspect of the subject invention relates to a method of preparing a polarizing plate, comprising drawing a melt-extruded polyester resin by a draw ratio of about 2 to about 10 in TD only, and thermal-stabilizing the drawn polyester resin at about 100 to about 300□ to prepare a polyester film; and bonding the polyester film to one side of a polarizer.

In a specific example, the method may further comprise bonding an optical film to the other side of the polarizer.

Another aspect of the subject invention relates to a liquid crystal display apparatus comprising the polarizing plate.

Advantageous Effects

The present invention provides a polarizing plate, a method of preparing the same, and an optical display apparatus including the same that can suppress rainbow spots, secure viewing angle, improve an image quality, and improve polarization degree of the polarizer and transmittance, thereby having excellent optical properties and high contrast ratio. Further, the present invention provides a polarizing plate, a method of preparing the same, and an optical display apparatus including the same that may be no deterioration of polarization degree thereof, or able to minimize the deterioration, and thus the polarizing plate can suppress rainbow spots, even if the polarizing plate is exposed to high temperature. More further, the present invention provides a polarizing plate, a method of preparing the same, and an optical display apparatus including the same having high economic feasibility by using the drawn polyester film as a protective film for the polarizing plate over the whole orientations.

BEST MODE

Figure 1:
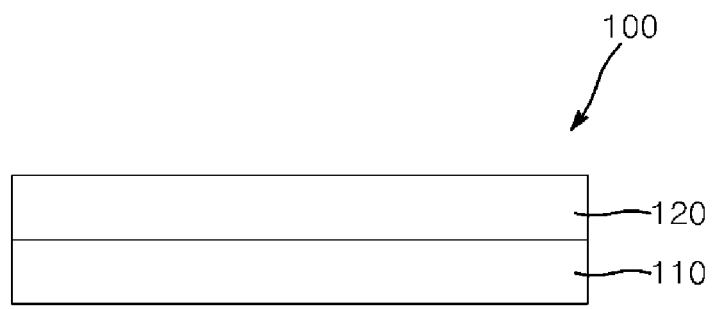
FIG. 1 is a sectional view of a polarizing plate according to one embodiment of the present invention.

Certain embodiments of the present invention will now be described in more detail such that they can easily have been made by an ordinary skilled person in the art to which this invention pertains with reference to the accompanying drawings. The present invention may be embodied in different ways and is not limited to the following embodiments. In the drawings, elements irrelevant to the description of embodiments of the present invention will be omitted for clarity. The same reference numerals will be used throughout the drawings and the description to refer to the same or similar constitutional elements.

As used herein, the terms such as "upper side" and "lower side" are defined with reference to the accompanying drawings. Thus, it will be understood that the term "upper side" can be used interchangeably with the term "lower side" or vice versa when viewed from different angles.

Figure 4:
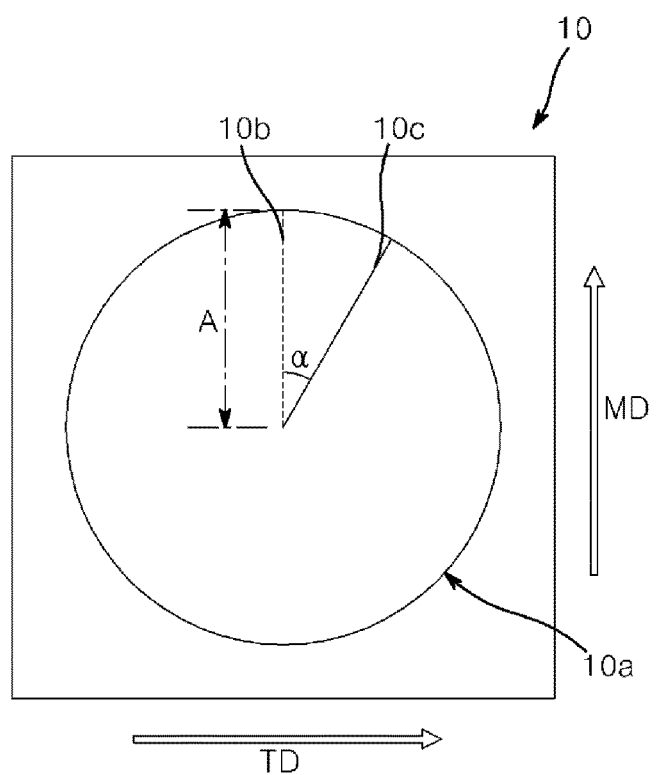
FIG. 4 is a conceptual view of thermal shrinkage in the present invention.

As used herein, the term 'thermal shrinkage', referring to FIG. 4, may be a value obtained from |B−A|/A×100, wherein, in a square polyester film specimen 10 having an about 200 mm length in MD and an about 200 mm length in TD, it draws a circle 10a having a radius A (0<A≤150 mm, e.g., 100 mm) based on the center point of the specimen 10, equally divides a circumference of the circle 10a into a plurality of segment at the same angle α (0<α≤10°, specifically about 5° in a certain range from the radius 10b of the circle parallel to MD to further draw a plurality of lines 10c of connecting one point on the circumference and the center of the circle, and measures a length B of the line 10c after the specimen 10 or circle 10a was left in any one condition selected from i) at about 85° C. for about 30 minutes, ii) at about 100° C. for about 30 minutes, iii) at about 120° C. for about 30 minutes, and iv) at about 150° C. for about 30 minutes. As used herein, the term 'maximum thermal shrinkage' means the maximum value among the measured thermal shrinkages.

As used herein, the term 'maximum thermal shrink angle' means to an angle between a radius 10b of the circle parallel to a MD and a straight line indicating the maximum thermal shrinkage when plotting an angle α in FIG. 4 and the thermal shrinkages measured in FIG. 4 to each other according to one point on the circumference equally divided along the angle α using the polyester film specimen 10. As a result of plotting, the plotting result having a peanut form may be obtained.

As used herein, 'nx', 'ny' and 'nz' are refractive index in three-dimensional coordinate system (x-axis direction, y-axis direction, and z-axis direction (thickness direction)) of the polyester film at a wavelength of 550 nm, respectively, unless specifically mentioned. For example, 'x-axis direction' may be 'MD', or 'y-axis direction' may be 'TD'.

Hereinafter, a polarizing plate according to one embodiment of the present invention will be described in detail with reference to FIG. 1.

Referring to FIG. 1, a polarizing plate 100 according to one embodiment of the invention may include a polarizer 110, and a polyester film 120 formed on an upper side of the polarizer 110, wherein the polyester film 120 may have a maximum thermal shrink angle of about 10° or less, and any one of nx and ny of about 1.65 or more.

A polarizing plate in a liquid crystal display apparatus may be exposed to high temperature for a long period of time. In this case, polarization degree of the polarizing plate may be decreased, thereby deteriorated optical properties of the liquid crystal display apparatus. The polarizing plate according to one embodiment of the present invention may include the polyester film 120 having the maximum thermal shrink angle of about 10° or less, thus even if the polarizing plate is exposed to high temperature, polarization degree and transmittance thereof may not be decreased. The maximum thermal shrink angle of the polyester film may be specifically about 0° to about 10°, more specifically about 0° to about 9°, further more specifically about 0° to about 7°, for example 0°, 1°, 2°, 3°, 4°, 5°, 6°, 7°, 8°, 9°, or 10°, and further preferred closer to 0°.

Generally, conventional polyester film has crystallization behavior during drawing process. Thus, a polarizing plate using the polyester film may suffer from rainbow spots, thereby deteriorating the image quality. If the polyester film has both of nx and ny of less than about 1.65, or both of nx and ny of about 1.65 or more, the polarizer having the polyester film as a protective film may suffer from rainbow spots by birefringence due to change of retardation depending on incident angle and wavelength. However, according to an embodiment of the present invention, the polyester film 120 in the polarizing plate has any one of nx and ny of about 1.65 or more, so that it can remarkably suppress rainbow spots.

In one embodiment, nx may be about 1.65 or more, specifically about 1.67 to about 1.75, and ny may be less than about 1.65, specifically about 1.45 to about 1.60. In another specific example, ny may be about 1.65 or more, specifically about 1.67 to about 1.72, more specifically about 1.69 to about 1.72, and nx may be less than about 1.65, specifically about 1.45 to about 1.60. Herein, an absolute value of nx−ny (|nx−ny|) may be about 0.1 to about 0.2, specifically about 0.1 to about 0.18, for example 0.1, 0.11, 0.12, 0.13, 0.14, 0.15, 0.16, 0.17, or 0.18. Thereby, the polyester film may improve viewing angle and also suppress rainbow spots.

The polyester film 120 may have a maximum thermal shrinkage of about 0.8% or less, specifically about 0 to about 0.8%, more specifically about 0 to about 0.6%, for example 0%, 0.1%, 0.2%, 0.3%, 0.4%, 0.5%, 0.6%, 0.7%, or 0.8%, and more preferred closer to 0%. Within this range, there may be no problem of deterioration of optical properties of a liquid crystal display apparatus due to decrease in transmittance of a polarizing plate when the polarizing plate is exposed to high temperature for a long period of time. In one embodiment, the polyester film may have thermal shrinkage of about 0 to about 0.8% over the whole orientations (about 0° to about 360°) based on a circle of FIG. 4. Within this range, the polyester film may have improved optical properties.

The polyester film 120 has a super high retardation due to drawing it by high draw ratio, so that it can suppress rainbow spots to prevent the polarizing plate from deteriorating an image quality when incorporated the polarizing plate into the liquid crystal display apparatus. In a specific example, the polyester film 120 may have a thickness of about 25 to about 115 μm and front retardation (Ro) of about 5,000 nm to about 15,000 nm, specifically about 10, 100 to about 12,000 nm at a wavelength of 550 nm. Within the range, when the polyester film is used as a protective film of a polarizer, it can suppress rainbow spots. Moreover, it can inhibit a light leakage phenomenon which leaks light from sides, and further suppress a change of retardation depending on an incident angle to thereby preventing the difference of retardations from increasing.

The polyester film 120 may have a degree of biaxiality (NZ) of about 1.8 or less, specifically, about 1.0 to about 1.8 at a wavelength of 550 nm, as represented by Equation 1. Within this range, the polyester film can have the effect of controlling rainbow spots due to birefringence:

$$NZ=(nx-nz)/(nx-ny) \qquad \text{Equation 1}$$

(whererin nx, ny and nz are refractive index in x-axis direction, y-axis direction and z-axis direction of the polyester film at a wavelength of 550 nm, respectively).

The polyester film 120 may have a retardation in thickness direction (Rth) of about 15,000 nm or less, for example about 10,000 to about 13,000 nm at a wavelength of 550 nm, as measured by Equation 2. Within this range, the polyester film can have the effect of controlling rainbow spots due to birefringence:

$$Rth=\{(nx+ny)/2nz\}\times d \qquad \text{Equation 2}$$

(whererin nx, ny and nz are refractive index in x-axis direction, y-axis direction and z-axis direction of the polyester film at a wavelength of 550 nm, respectively, and d is a thickness of the film (unit: nm)).

The polyester film 120 may have an absolute value of molecular orientation angle (θr) based on TD in the polyester molecular of about 5° or less, specifically about 0 to about 5°, for example 0°, 1°, 2°, 3°, 4° or 5°. Within this range, it can improve polarization degree of the polarizing plate and brightness of a screen, thereby increasing contrast ratio thereof, and further preventing polarization degree of the polarizing plate from deteriorating even if exposed to high temperature for a long period of time. The molecular orientation angle may be measured by any typical methods, for example, by using KOBRA-WX100 (Oji Co., Ltd) and AXOSCAN (Axometrics Co., Ltd).

The polyester film 120 may be any transparent films formed of a polyester resin without limitation. In embodiments, the polyester film may be a film formed of at least one of polyethylene terephthalate resin, polybutylene terephthalate resin, polyethylene naphthalate resin, and polybutylene naphthalate resin.

The polyester film 120 may have a thickness of about 25 μm to about 115 μm. Within this range, when the film is stacked on the polarizer, the obtained product can be used as a polarizing plate.

Although not shown in FIG. 1, the polyester film 120 may include a functional coating layer on an upper side thereof, for example, a hard coating layer, an anti-reflective layer or an anti-fingerprint layer to impart functionality. The functional coating layer may have a thickness from about 1 μm to about 10 μm. Within this range, when the film is stacked on the polarizer, the obtained product can be used as a polarizing plate.

In addition, although not shown in FIG. 1, the polyester film 120 may further include a side coating layer on a lower side thereof. The polyester film has a hydrophobic surface. In particular, when a polyethylene terephthalte film is used as a protective film, the protective film exhibits higher hydrophobicity. To apply such a film to the polarizing plate, the film is subjected to surface modification to convert a surface thereof from a hydrophobic surface to a hydrophilic surface. When surface modification using sodium hydroxide, which is used in existing cellulose films, is used for surface modification of the protective film, the surface of the protective film can be insufficiently modified or can be damaged. To solve such problems, a surface coating layer including a highly adhesive primer having hydrophobic and hydrophilic functional groups may be formed on the protective film. The primer having hydrophobic and hydrophilic functional groups may include polyester resins, polyvinyl acetate resins, or mixtures thereof, without being limited thereto. Mechanical properties and low water vapor permeability of the protective film may be maximized through addition of the surface coating layer, thereby imparting high resistance to severe external conditions to the polarizing plate. In addition, the surface coating layer may be formed between the protective film and the polarizing plate to improve adhesion between the protective film and the polarizer.

Since the polarizer 110 has molecules aligned in a specific direction, the polarizer transmits only light of a specific direction when incorporated into the liquid crystal display apparatus. The polarizer may be prepared by dyeing a polyvinyl alcohol film with iodine or a dichroic dye, followed by drawing it in a certain direction. Specifically, the polarizer is prepared through processes of swelling, dyeing, drawing, and cross-linking. Each process may be performed by a method generally known to those skilled in the art.

The polarizer 110 may have a thickness from about 5 μm to about 30 μm. Within this range, the polarizer can be used to the polarizing plate for a liquid crystal display apparatus.

Also, the polarizing plate 100 may have a thickness from about 25 μm to about 500 μm. Within this range, the polarizing plate can be used as a polarizing plate for a liquid crystal display apparatus. The polarizing plate may have a polarization degree of about 99.99% or more, for example about 99.99 to about 99.999%. Further, the polarizing plate may have transmittance (for example, as measured at visible light range, i.e., a wavelength of 550 nm) of about 40% or more, for example about 40 to about 80%. Within this range, when the polarizing plate is incorporated into the liquid crystal display apparatus, the liquid crystal display apparatus may not suffer from deterioration in optical properties.

Although not shown in FIG. 1, an adhesive layer for the polarizing plate may be formed between the polarizer 110 and the polyester film 120 to improve mechanical strength of the polarizing plate. The adhesive layer may include any typical adhesives, for example, at least one of water-based adhesives, pressure-sensitive adhesives, and photocurable adhesive. In addition, although not shown in FIG. 1, a bonding agent layer may be further formed on a lower side of the polarizer 110, thereby stacking the polarizing plate on a liquid crystal display panel. The bonding agent may include, but not limited to, a pressure-sensitive bonding agent.

Hereinafter, a polarizing plate according to another embodiment of the present invention will be described with reference to FIG. 2.

Figure 2:
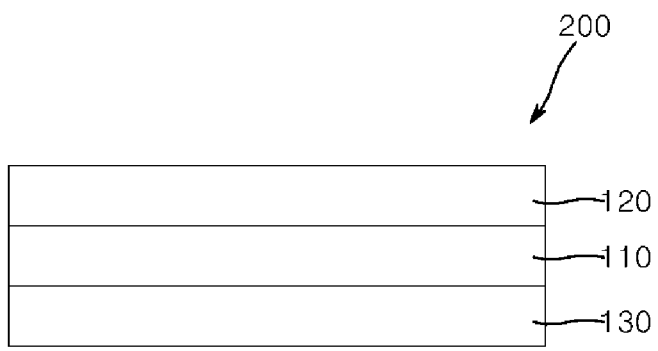
FIG. 2 is a sectional view of a polarizing plate according to another embodiment of the present invention.

Referring to FIG. 2, a polarizing plate 200 according to another embodiment of the invention may include a polarizer 110; a polyester film 120 formed on an upper side of the polarizer 110; and an optical film 130 formed on a lower side of the polarizer 110. The polyester film 120 may have a maximum thermal shrink angle of about 10° or less, and any one of nx and ny of about 1.65 or more. Except further including the optical film 130, the polarizing plate 200 is substantially identical to the polarizing plate 100 according to the first embodiment of the present invention. In this way, the polarizing plate may further include the optical film, thereby enhancing mechanical strength thereof and minimizing the influence of the adhesive layers on the polarizer. In this regard, the optical film will hereinafter be described.

The optical film 130 is formed on one side of the liquid crystal display panel and may have a predetermined range of phase difference, thereby compensating for viewing angle. In one embodiment, the optical film may have a front retardation (Ro) of about 40 to about 60 nm at a wavelength of 550 nm. Within this range, the optical film may exhibit an optimal image quality. The optical film 130 may have a thickness of about 25 μm to about 500 μm, specifically about 25 to about 50 μm. Within this range, the optical film may be used to a polarizing plate for a liquid crystal display apparatus.

The optical film 130 is a transparent optical film, and may be a polyester film including polyethylene naphthalate, polybutylene naphthalate and the like, or a non-polyester film. Examples of the non-polyester film may include celluloses including triacetyl cellulose and the like, cyclic polyolefin resins, polycarbonate resins; polyether sulfone resins; polysulfone resins, polyamide resins, polyimide resins, polyolefin resins, polyarcylate resins, polyvinyl alcohol resins, polyvinyl chloride resins, and polyvinylidene chloride resins.

Although not shown in FIG. 2, an adhesive layer for the polarizing plate may be formed between the polarizer 110 and the optical film 130 to improve mechanical strength of the polarizing plate. The adhesive layer may include any typical adhesives, for example, at least one of water-based adhesive, pressure-sensitive adhesive, and photocurable adhesive. In addition, although not shown in FIG. 2, a bonding agent layer for the polarizing plate may be further formed on a lower side of the optical film 130, thereby stacking the polarizing plate on a liquid crystal display panel. The bonding agent may include, but not limited to, a pressure-sensitive bonding agent.

Hereinafter, a method of preparing a polarizing plate according to the present invention will be described.

A method of preparing a polarizing plate according to one embodiment of the present invention may include drawing a melt-extruded polyester resin in a draw ratio of about 2 to about 10, in TD only, thermal-stabilizing the drawn polyester resin to prepare a polyester film, and bonding the polyester film to one side of a polarizer.

The polyester film may be prepared by drawing in TD alone without drawing in MD. Thus, the polyester film may have TD draw ratio of about 2 to about 10, and MD draw ratio of about 1 to about 1.1. Here, "MD draw ratio of about 1 to about 1.1" means a state that there is no additional drawing process except inevitably being drawn due to mechanical movement of the film when drawing the film while moving it in MD. In particular, 'draw ratio of 1' means a non-drawing state. The term 'draw ratio' as used in the polyester film may mean the ratio of a length of the film after drawing to a length of the film before drawing. When the film is drawn by a draw ratio of about 2 to about 10 in both MD and TD, respectively, molecular orientation angle (θr) thereof may exceed about 5° or retardation may be too low, so that rainbow spots may be generated.

If TD draw ratio is less than about 2, the polyester film has a low retardation, so that the polyester film can suffer from rainbow spots in applying to a liquid crystal display apparatus, and easily tear due to deterioration of physical properties. On the other hand, if TD draw ratio is more than about 10, the polyester film can be broken in the drawing process. For example, TD draw ratio may be about 3 to about 8.

Drawing may be performed using at least one of dry drawing and wet drawing. The drawing temperature may be from about (Tg−20)° C. to about (Tg+50)° C. based on Tg of the polyester resin, specifically about 70° C. to about 150° C., more specifically from about 80° C. to about 130° C., still more specifically from about 90° C. to about 120° C. Within this range, the polyester film having super high retardant mention above, maximum thermal shrinkage of about 0.8% or less, and maximum thermal shrink angle of about 10° or less can be prepared.

The method may further include thermal-stabilizing the drawn polyester resin after drawing the polyester film. The polyester film drawn by high draw ratio tends to have a restoring force which restores the film into its original state. The thermal-stabilizing step may control stress to the restoring force of the polyester film, thereby maintain the thermal-stabilization of the film. As a result, the polyester film having maximum thermal shrinkage of about 0.8% or less, maximum thermal shrink angle of about 10° or less and molecular orientation angle of to about 5° or less can be prepared.

The thermal-stabilizing step may include heating the drawn polyester film whiling fixing the both TD ends of the polyester film and moving the film in MD. Herein, the polyester film is drawn by a relatively low draw ratio compared to that of drawing step. TD draw ratio may be more than about 0 to about 3 or less, specifically about 0.1 to about 2, more specifically about 0.1 to about 1. Fixing the film in TD is performed just enough to prevent restoration of the film due to the high draw ratio. There is no substantial TD drawing effect on the polyester film (tension-relaxation).

Heating in the thermal-stabilizing step may be carried out at about 100 to about 300° C. Within the range, the polyester film having maximum thermal shrinkage of about 0.8% or less, maximum thermal shrink angle of about 10° or less and molecular orientation angle of about 5° or less can be prepared. Heating may be carried out for about 1 sec to about 2 hours.

The polarizer may be prepared by dyeing a polyvinyl alcohol film with iodine or a dichroic dye, followed by drawing the film in a certain direction. The method of performing such steps may be generally known to those skilled in the art.

The polyester film may be bonded to the polarizer using a typical adhesive. The adhesive may include at least one of water-based adhesives, pressure-sensitive adhesives, and photocurable adhesives.

The preparation method according to one embodiment of the present invention may further include bonding an optical film to the other side of the polarizer. An adhesive for bonding the optical film may include at least one of water-based adhesives, pressure-sensitive adhesives, and photocurable adhesives.

Figure 3:
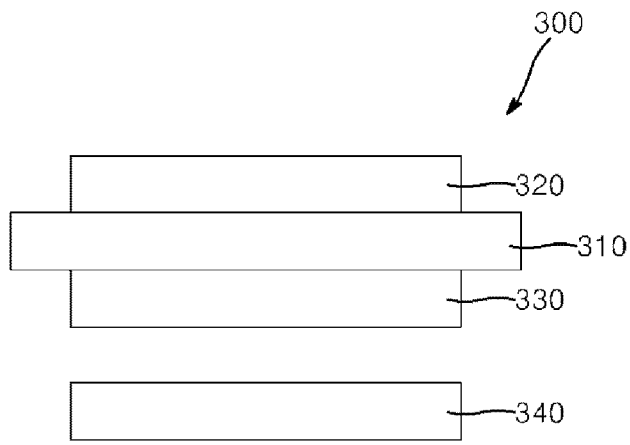
FIG. 3 is a sectional view of a liquid crystal display apparatus according to one embodiment of the present invention.

The liquid crystal display apparatus of the present invention may include a module for a liquid crystal display apparatus comprising the polarizing plate according to embodiments of the present invention. Referring to FIG. 3, a module 300 for a liquid crystal display apparatus according to one embodiment of the present invention may include a liquid crystal display panel 310; a first polarizing plate 320 formed on an upper side of the liquid crystal display panel 310; a backlight unit 340 formed on a lower side of the liquid crystal display panel 310; and a second polarizing plate 330 formed on the lower side of the liquid crystal display panel 310 and placed between the liquid crystal display panel 310 and the backlight unit 340, wherein the first polarizing plate 320 may include the polarizing plate according to one embodiment of the present invention.

The liquid crystal display panel 310 may include a liquid crystal panel comprising a liquid crystal cell layer sealed between a first substrate and a second substrate. In one embodiment, the first substrate may be a color filter (CF) substrate (upper substrate), and the second substrate may be a thin film transistor (TFT) substrate (lower substrate).

The first substrate and second substrate may be the same or different, and be a glass substrate or a plastic substrate. the plastic substrate may include polyethylene terephthalate (PET), polycarbonate (PC), polyimide (PI), polyethylene naphthalate (PEN), polyether sulfone (PES), polyacrylate (PAR), and cycloolefin copolymer (COC) substrates, which can be applied to flexible displays, without being limited thereto. the liquid crystal cell layer may a liquid crystal layer including vertical alignment (VA) mode, in-place switching (IPS) mode, fringe field switching (FFS) mode, and twisted nematic (TN) mode liquid crystals.

The second polarizing plate 330 may be a common polarizing plate and may be, for example, a polarizing plate comprising a polyester film, which is one having a maximum thermal shrink angle of less than about 10°, one having any one of a refractive index of x-axis direction (nx) at a wavelength of 550 nm and a refractive index of y-axis direction (ny) at a wavelength of 550 nm of less than about 1.65, or one having an absolute value of molecular orientation angle of more than about 5°.

FIG. 3 shows the case that a first polarizing plate is the polarizing plate according to the first embodiment of the present invention. However, a second polarizing plate may be the polarizing plate according to one embodiment of the present invention, or both the first and second polarizing plate may be the polarizing plates according to the embodiment of the present invention. Thus, all these cases may be included in the scope of the subject invention.

The first polarizing plate 320 and second polarizing plate 330 may be formed on one side of a liquid crystal display panel by a bonding agent layer (not shown in FIG. 3), respectively. The bonding agent layer may be any typical bonding agents, for example, pressure sensitive bonding agents The backlight unit 340 is one conventionally used in the liquid crystal display apparatus and may include a light source, waveguide plate, reflecting plate, diffusion plate, and etc.

MODE FOR INVENTION

Hereinafter, the construction and functionality of the present invention will be described in more detail with reference to preferred examples of the present invention. However, it should be noted that these examples are provided for the preferred illustrations of the present invention, and should be not construed in any way as limiting the present invention.

Details of components used in Examples and Comparative Examples are as follows:

(1) Material of Polarizer: Polyvinyl alcohol film (VF-PS6000, KURARAY Co., Ltd., Japan, thickness: 60 μm)

(2) Polyethylene terephthalate film: Polyethylene terephthalate film having nx, ny, maximum thermal shrinkage, maximum thermal shrink angle and molecular orientation angle shown in Table 1.

(3) Optical film: Triacetyl cellulose film (KC4DR-1, FUJI Co., Ltd., Japan, thickness: 40 μm).

EXAMPLES 1 TO 4

A polyvinyl alcohol film was drawn to a drawing ratio of 3 at 60° C., iodine was adsorbed onto the polyvinyl alcohol film, followed by drawing to a drawing ratio of 2.5 in a boric acid solution of 40° C., thereby preparing a polarizer. Then, a triacetyl cellulose film was stacked on one side of the polarizer using an adhesive (Z-200, NIPPON GOSHEI Co., Ltd.), and a polyethylene terephthalate film shown in Table 1 was stacked on the other side of the polarizer using an adhesive (Z-200, NIPPON GOSHEI Co., Ltd.) thereby preparing a polarizing plate.

Polyethylene terephthalate film shown in Table 1 was prepared by melt-extruding a polyethylene terephthalate resin, drawing the melt-extruded film to a draw ratio of 6.1 in TD but not in MD while mechanically moving the film in MD using a roll, under the conditions listed in Table 1, followed by tension-relaxation treatment. The polyethylene terephthalate film had a thickness of 80 μm.

The maximum thermal shrinkage and maximum thermal shrink angle of the polyethylene terephthalate film were measured using IM-6600 (KEYENCE Co., Ltd.) according to FIG. 4. Here, a square polyester film specimen having a 200 mm length in MD and a 200 mm length in TD is used as a film specimen. The maximum thermal shrinkage and maximum thermal shrink angle were measured on the specimen by drawing a circle (radius: 100 mm, having its center aligned with the center of the specimen), equally dividing a circumference of the circle to obtain a of 5°, and then leaving the divided circle at 100° C. for 30 minutes. Ro of the polyethylene terephthalate film was measured at a wavelength of 550 nm using AXOSCAN (Axometrics Co., Ltd). The molecular orientation angle of the polyethylene terephthalate film was measured using KOBRA-WX100 (Oji Co., Ltd) and AXOSCAN (Axometrics Co., Ltd).

COMPARATIVE EXAMPLES 1 TO 3

A polarizing plate was prepared in the same manner as in Example 1 except that polyethylene terephthalate films having nx, maximum thermal shrinkage, maximum thermal shrinkage, and molecular orientation angle listed in Table 1 were used. The polyethylene terephthalate film in Table 1 was prepared by melt-extruding a polyethylene terephthalate resin, drawing the extruded resin under the conditions listed in Table 1, followed by crystallization and stabilization treatments.

The films in Comparative Examples 1 to 2 were drawn to a ratio of 6.1 in TD but not in MD. The film in Comparative Example 3 was drawn in to a draw ratio of 3 in both MD and TD, respectively. The polyethylene terephthalate film had a thickness of 80 μm.

(1) Transmittance and Polarization Degree: Transmittance and polarization degree for a polarizing plate were measured using V7100 (JASCO Co., Ltd.). Further, after left the polarizing plate at high temperature for a long period of time (e.g., at 85° C. for 120 hours), transmittance and polarization degree were evaluated in the same method as that mentioned above. Herein, the measurement was performed at wavelength 550 nm.

(2) Rainbow spots: The polarizing plates were displaced on an upper side of a liquid crystal display panel, on a lower side of a liquid crystal display panel of a VA mode liquid crystal, and between a liquid crystal display panel and a backlight unit, respectively, to assemble them. Using a Spectroradiometer (SR-3A, TOPCON Co., Ltd.), it was observed whether rainbow spots were generated. When there are no rainbow spots, it was evaluated as X, and when there are rainbow spots, it was evaluated as ○. In addition, after leaving the polarizing plate at high temperature for a long period of time (e.g., at 85° C. for 120 hours), it was evaluated whether rainbow spots were generated, in a manner similar to the above method.

(3) Contrast: The polarizing plates were displaced on the upper side of the liquid crystal display panel, on the lower

TABLE 1

| | Tension-Relaxation Treatment | Temp. (° C.) | nx | ny | thickness (μm) | Maximum thermal shrink angle (°) | Maximum thermal shrinkage (%) | Molecular orientation angle (°) | Ro (nm) |
|---|---|---|---|---|---|---|---|---|---|
| Example 1 | ○ | 100 | 1.69 | 1.56 | 80 | 9 | 0.58 | 2.1 | 10,100 |
| Example 2 | ○ | 150 | 1.69 | 1.56 | 80 | 7 | 0.55 | 2.1 | 10,100 |
| Example 3 | ○ | 200 | 1.69 | 1.56 | 80 | 5 | 0.43 | 2.1 | 10,100 |
| Example 4 | ○ | 250 | 1.69 | 1.56 | 80 | 2 | 0.21 | 0.0 | 10,100 |
| Comparative Example 1 | X | — | 1.69 | 1.56 | 80 | 16 | 1.02 | 9.7 | 10,100 |
| Comparative Example 2 | ○ | 70 | 1.64 | 1.58 | 80 | 7 | 1.02 | 31.4 | 4,800 |
| Comparative Example 3 | ○ | 100 | 1.64 | 1.63 | 80 | 9 | 0.58 | 43.6 | 800 |

The polarizing plates prepared in Examples and Comparative Examples were evaluated as to the following properties. Results are shown in Table 2.

side of the liquid crystal display panel of VA mode liquid crystal (Model name) and between the liquid crystal display panel and the backlight unit, respectively, to assemble them,

TABLE 2

| | Ttransmittance (Ts, %) | | Polarization degree (PE, %) | | Rainbow spots | | Contrast | |
|---|---|---|---|---|---|---|---|---|
| | Initial | After left for a long period of time at high temp. | Initial | After left for a long period of time at high temp. | Initial | After left for a long period of time at high temp | CR | CR/CR0 (%) |
| Example 1 | 42.60 | 42.69 | 99.9931 | 99.9925 | X | X | 5,340 | 1.40 |
| Example 2 | 42.60 | 42.69 | 99.9945 | 99.9939 | X | X | 5,450 | 1.43 |
| Example 3 | 42.60 | 42.68 | 99.9965 | 99.9959 | X | X | 5,580 | 1.46 |
| Example 4 | 42.60 | 42.69 | 99.9985 | 99.9979 | X | X | 5,870 | 1.54 |
| Comparative Example 1 | 42.60 | 42.67 | 99.9402 | 99.9382 | X | X | 3,810 | 1.00 |
| Comparative Example 2 | 42.60 | 42.68 | 99.9894 | 99.9878 | ○ | ○ | 4,869 | 1.28 |
| Comparative Example 3 | 42.60 | 42.68 | 99.9945 | 99.9939 | ○ | ○ | 5,450 | 1.43 | followed by measuring Contrast Ratio (CR) using a luminance meter SR-3A (Topcon Co., Ltd.). Also, a contrast ratio of the specimen of Comparative Example 1 (which has the lowest contrast ratio) was taken as CRO. Thus, Contrast ratio (CR/CRO) was calculated as a percent ratio of CR to CRO.

As shown in Table 2, the polarizing plate of the present invention did not suffer from rainbow spots, and optical properties including polarization degree and transmittance were good. Moreover, even after left at high temperature for a long period of time, the polarizing plate did not suffer from rainbow spots, and optical properties including polarization degree and transmittance were not changed.

On the contrary, in Comparative Example 1, the film was drawn to a draw ratio of 6.1 in TD, did not tension-relaxed, and had a maximum thermal shrink angle of more than 10°. Thus, Comparative Example 1 did not suffer from rainbow spots, but had bad polarization degree. Still further, even after left at high temperature for a long period of time, polarization degree and transmittance of the polarizing plate in Comparative Example 1 were decreased in comparison with the present invention.

Further, in Comparative Example 2, the film was drawn to a draw ratio of 6.1 in TD, but a temperature range in tension-relaxing got out of the range of the present invention, and any one of nx and ny thereof was not 1.65 or more. Thus, Comparative Example 2 suffered from rainbow spots, and had an inferior polarization degree. Even after left at high temperature for a long period of time, the polarizing plate in Comparative Example 2 had an inferior polarization degree in comparison with the present invention.

Still further, in Comparative Example 3, the film was drawn to a draw ratio of 3 in both MD and TD, and any one of nx and ny thereof was not 1.65 or more. Thus, Comparative Example 3 suffered from rainbow spots. Moreover, even after left at high temperature for a long period of time, the polarizing plate in Comparative Example 3 still suffered from rainbow spots.

Simple modification or changes of the present invention can be easily performed by those of ordinary skill in the art. Therefore, it can be regarded that such modifications or changes are included in the scope of the present invention.

The invention claimed is:

1. A polarizing plate comprising:
   a polarizer; and
   a polyester film formed on an upper side of the polarizer,
   wherein the polyester film has a maximum thermal shrink angle of about 10° or less, a refractive index of an x-axis direction (nx) at a wavelength of 550 nm of about 1.65 or more, a refractive index of a y-axis direction (ny) at a wavelength of 550 nm of about 1.65 or less, and a front retardation (Ro) of about 5,000 to about 15,000 nm at a wavelength of 550 nm,
   wherein the polyester film has a retardation in a thickness direction (Rth) of 10,000 nm to 13,000 nm at a wavelength of 550 nm, as calculated by Equation 2:

$$Rth=\{(nx+ny)/2-nz\}\times d \quad \text{Equation 2}$$

wherein, in Equation 2, nx, ny and nz are refractive indices in an x-axis direction, a y-axis direction and a z-axis direction of the polyester film at a wavelength of 550 nm, respectively, and d is a thickness of the film in nm.

2. The polarizing plate according to claim 1, wherein an absolute value of nx−ny is about 0.1 to about 0.2.

3. The polarizing plate according to claim 1, wherein the polyester film has a maximum thermal shrinkage of about 0.8% or less.

4. The polarizing plate according to claim 1, wherein the polyester film has an absolute value of a molecular orientation angle (θr) of a polyester molecule based on a transverse direction (TD) of about 0° to about 5°.

5. The polarizing plate according to claim 1, wherein the polyester film has a thickness of about 25 to about 115 μm.

6. The polarizing plate according to claim 1, wherein the front retardation (Ro) of the polyester film is about 10,100 to about 12,000 nm.

7. The polarizing plate according to claim 1, wherein the polyester film is a TD drawn film.

8. The polarizing plate according to claim 1, wherein the polyester film has a degree of biaxiality (NZ) of about 1.8 or less at a wavelength of 550 nm, as represented by Equation 1:

$$NZ=(nx-nz)/(nx-ny) \quad \text{Equation 1}$$

(wherein nx, ny and nz are refractive indices in an x-axis direction, a y-axis direction and a z-axis direction of the polyester film at a wavelength of 550 nm, respectively).

9. The polarizing plate according to claim 1, wherein the polyester film is a film formed of at least one of polyethylene terephthalate, polybutylene terephthalate, polyethylene naphthalate and polybutylene naphthalate.

10. The polarizing plate according to claim 1, further comprising an optical film on a lower side of the polarizer.

11. The polarizing plate according to claim 10, wherein the optical film has a front retardation (Ro) of about 40 to about 60 nm at a wavelength of 550 nm.

12. The polarizing plate according to claim 10, wherein the optical film is a film formed of at least one of cellulose, polyester, cyclic polyolefin, polycarbonate, polyether sulfone, polysulfone, polyimide, polyimide, polyolefin, polyacrylate, polyvinyl alcohol, polyvinyl chloride, and polyvinylidene chloride resins.

13. The polarizing plate according to claim 1, wherein the polarizing plate has a polarization degree of about 99.99% or more, and a transmittance of about 40% or more.

14. A liquid crystal display apparatus comprising the polarizing plate according to claim 1.

15. A polarizing plate comprising:
   a polarizer; and
   a polyester film formed on an upper side of the polarizer,
   wherein the polyester film has an absolute value of a molecular orientation angle (θr) of about 5° or less, and
   wherein the polyester film has a refractive index of an x-axis direction (nx) at a wavelength of 550 nm of about 1.65 or more, a refractive index of a y-axis direction (ny) at a wavelength of 550 nm of about 1.65 or less, and a front retardation (Ro) of about 5,000 to about 15,000 nm at a wavelength of 550 nm,
   wherein the polyester film has a retardation in a thickness direction (Rth) of 10,000 nm to 13,000 nm at a wavelength of 550 nm, as calculated by Equation 2:

$$Rth=\{(nx+ny)/2-nz\}\times d \quad \text{Equation 2}$$

wherein, in Equation 2, nx, ny and nz are refractive indices in an x-axis direction, a y-axis direction and a z-axis direction of the polyester film at a wavelength of 550 nm, respectively, and d is a thickness of the film in nm.

* * * * *